United States Patent
Guo et al.

(10) Patent No.: US 11,985,705 B2
(45) Date of Patent: May 14, 2024

(54) SYSTEM AND METHOD FOR ACTIVE CARRIER SENSE BASED CSMA/CA FOR IEEE 802.15.4 SYSTEM TO AVOID PACKET DISCARD CAUSED BY INTERFERENCE

(71) Applicants: Mitsubishi Electric Research Laboratories, Inc., Cambridge, MA (US); Mitsubishi Electric Corporation, Tokyo (JP)

(72) Inventors: Jianlin Guo, Newton, MA (US); Philip Orlik, Cambridge, MA (US); Yukimasa Nagai, Tokyo (JP); Takenori Sumi, Tokyo (JP); Pu Wang, Cambridge, MA (US); Kieran Parsons, Cambridge, MA (US)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 433 days.

(21) Appl. No.: 17/466,420

(22) Filed: Sep. 3, 2021

(65) Prior Publication Data
US 2023/0067933 A1    Mar. 2, 2023

Related U.S. Application Data

(60) Provisional application No. 63/236,305, filed on Aug. 24, 2021.

(51) Int. Cl.
*H04W 74/08*   (2009.01)
*H04W 16/14*   (2009.01)
(Continued)

(52) U.S. Cl.
CPC ....... *H04W 74/0816* (2013.01); *H04W 16/14* (2013.01); *H04W 84/18* (2013.01)

(58) Field of Classification Search
CPC .. H04W 74/0816; H04W 16/14; H04W 84/18
See application file for complete search history.

(56) References Cited

U.S. PATENT DOCUMENTS

2022/0085924 A1*  3/2022  Talarico ............... H04L 1/1854

FOREIGN PATENT DOCUMENTS

CN     107210871 A  *  9/2017  .......... H04L 1/1861
KR   20100026913 A  *  3/2010
(Continued)

*Primary Examiner* — Saad A. Waqas
(74) *Attorney, Agent, or Firm* — Gene Vinokur; Hironori Tsukamoto (57) ABSTRACT

A computer-executed method is provided for IEEE 802.15.4 devices based on an active carrier sense based carrier-sense multiple access with collision avoidance (ACS-CSMA/CA) control program and standard CSMA/CA control program for coexistence of an IEEE 802.15.4 network composing of IEEE 802.15.4 devices and IEEE 802.11 network composing of IEEE 802.11 devices sharing frequency spectra between the networks. The computer-executed method is provided on an IEEE 802.15.4 device, and causes a processor of the IEEE 802.15.4 device to perform steps that include estimating a severity of IEEE 802.11 interference based on a severity estimation metric, selecting the ACS-CSMA/CA control program based on the estimated severity. The ACS-CSMA/CA control program is configured to perform dynamically updating a maximum number of backoffs (macMaxCSMABackoffs) based on the estimated severity,cdetermining if a number of backoffs (NB) exceeds the updated macMaxCSMABackoffs, performing consecutive CCA operation to continuously detect channel status, and transmitting frames when the detected channel status is an idle state or incrementing number of retransmissions (NR) when the detected channel status is a busy state.

22 Claims, 10 Drawing Sheets

(51) Int. Cl.
*H04W 74/0816* (2024.01)
*H04W 84/18* (2009.01)

(56) References Cited

FOREIGN PATENT DOCUMENTS

KR       20210154251 A  *  12/2021
WO    WO-2008043316 A1  *  4/2008  ............ H04W 24/02

* cited by examiner

| 802.11ah Traffic (kbps) | 802.15.4g Traffic (kbps) | Receiving Rate (802.11ah) | Receiving Rate (802.15.4g) |
|---|---|---|---|
| 800 | 180 | 99.99% | 4.32% |
| 600 | 150 | 99.99% | 15.38% |
| 500 | 100 | 99.99% | 23.51% |
| 500 | 80 | 99.99% | 28.77% |
| 400 | 50 | 99.99% | 84.27% |
| 400 | 10 | 99.99% | 98.99% |
| 200 | 50 | 99.98% | 99.98% |

FIG. 8

SYSTEM AND METHOD FOR ACTIVE CARRIER SENSE BASED CSMA/CA FOR IEEE 802.15.4 SYSTEM TO AVOID PACKET DISCARD CAUSED BY INTERFERENCE

FIELD OF THE INVENTION

This invention relates generally to coexistence of heterogenous wireless communication networks, and particularly to coexistence of IEEE 802.15.4 systems and IEEE 802.11 systems.

BACKGROUND OF THE INVENTION

Internet of Things (IoT) applications have been rapidly growing. A broad range of wireless communication technologies have been developed to cater the diverse IoT applications such as smart meter and smart city. On the other hand, the spectrum allocation is constrained. As heterogeneous wireless technologies emerge, these wireless technologies compete for spectrum resource. Therefore, interference among networks using different communication technologies becomes critical issue to be addressed.

IEEE 802.11 and IEEE 802.15.4 are two commonly referred wireless standard families developed for local area and personal area applications. IEEE 802.11 based products are everywhere. A typical example is Wi-Fi devices. IEEE 802.15.4 standards have also been widely implemented in the commercial products such as Bluetooth and smart meter. Even IEEE 802.11 can operate in the higher frequency bands such as 5 GHz band, 6 GHz band and millimeter wave band, both IEEE 802.11 and IEEE 802.15.4 are designed to operate in Sub-1 GHz (S1G) band and 2.4 GHz band, e.g., IEEE 802.11ah operates in Sub-1 GHz band and IEEE 802.11n can operates in 2.4 GHz band and IEEE 802.15.4g can operate in both Sub-1 GHz band and 2.4 GHz band. Due to the fact that both IEEE 802.11 and IEEE 802.15.4 use unlicensed frequency bands, these two wireless technologies likely coexist. When a co-located IEEE 802.11 network and IEEE 802.15.4 network operate on shared or overlapped frequency band, one network becomes an interfering network to another network. The problem is that IEEE 802.11 network and IEEE 802.15.4 network cannot communicate with each other. Therefore, they are not able to coordinate for interference mitigation. Each network tries its best by using carrier sense multiple access with collision avoidance (CSMA/CA) mechanism to transmit data. This approach works well for homogeneous wireless networks, but it does not work well for heterogenous wireless networks where different networks have different functionalities, e.g., IEEE 802.11 backoff is much faster than IEEE 802.15.4 backoff. Accordingly, different networks have different wireless medium access capability. As a result, the network with more aggressive medium access mechanism will make more transmissions than the network with less aggressive medium access mechanism. IEEE 802.11 channel access mechanism is much more aggressive than IEEE 802.15.4 channel access mechanism. Therefore, new channel access mechanism must be provided for IEEE 802.15.4 system to better coexist with IEEE 802.11 system.

From perspective of the IEEE 802.15.4 system, besides IEEE 802.11 system, there are other interfering systems such as LoRa and SigFox systems.

Figure 1:
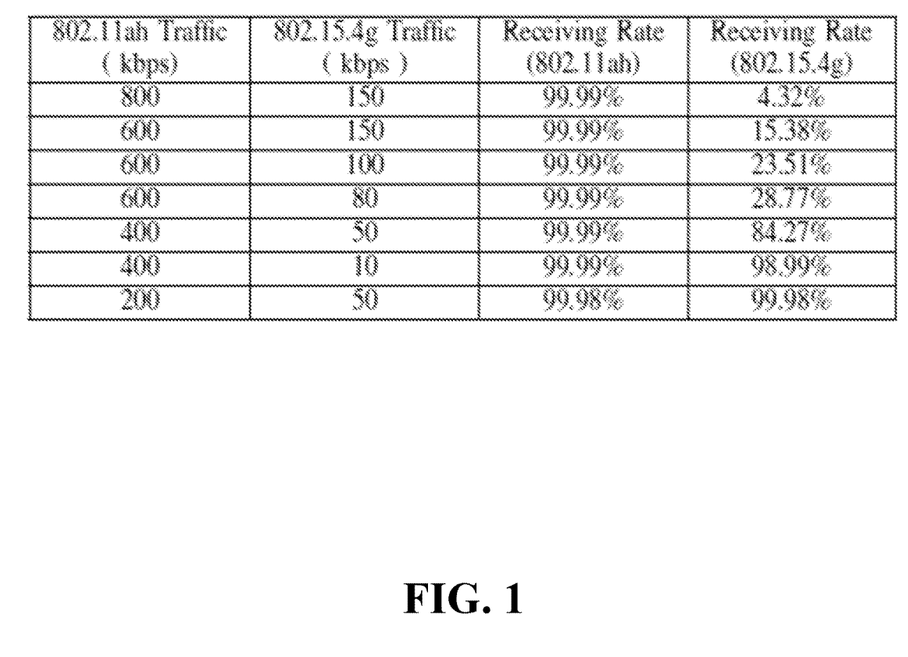
FIG. 1 shows sample data packet receiving rates of the coexisting IEEE 802.11ah network and IEEE 802.15.4g network using the standard coexistence mechanisms defined in IEEE 802.11ah standard.

The carrier sense multiple access with collision avoidance (CSMA/CA) mechanism is employed by both IEEE 802.11 and IEEE 802.15.4 standards for channel access contention. However, CSMA/CA in IEEE 802.11 standards is much more aggressive than CSMA/CA in IEEE 802.15.4 standards because IEEE 802.11 is developed for more powerful devices with higher data rates and IEEE 802.15.4 is developed for power constrained devices with lower data rates. Take IEEE 802.11ah and IEEE 802.15.4g for example. These two standards are developed for outdoor IoT applications, but their coexistence performance is much unbalanced. FIG. 1 shows that data packet delivery rates of the co-located IEEE 802.11ah network and IEEE 802.15.4g network operating in Sub-1 GHz band. Clearly, IEEE 802.15.4g network suffers when network traffic is heavy, but IEEE 802.11ah network always achieves near 100% of packet delivery rate for all workload scenarios. Therefore, the IEEE 802.15.4g network does not coexist well with IEEE 802.11ah network. As a result, IEEE 802.15.4g network is the victim and IEEE 802.11ah network is the winner in channel access contention.

As IoT applications are rapidly increasing, IEEE 802.15.4 based systems will experience interference from other wireless systems such as IEEE 802.11 system. Therefore, heterogeneous coexistence mechanism for IEEE 802.15.4 must be provided to achieve better coexistence, especially against more aggressive interfering sources.

Accordingly, it is desirable to provide new channel access methods for IEEE 802.15.4 to achieve better coexistence with more aggressive interfering networks.

SUMMARY OF THE INVENTION

Some embodiments are based on the recognition that IEEE 802.15.4 CSMA/CA mechanism is designed for wireless channel access contention among homogeneous IEEE 802.15.4 devices without taking the interference into account. IEEE 802.15.4 devices are typically low data rate low power devices whose energy saving is critical. Accordingly, the IEEE 802.5.4 CSMA/CA mechanism is designed to be not aggressive. As IoT applications are emerging, IEEE 802.15.4 systems will experience interference. However, IEEE 802.15.4 CSMA/CA mechanism does not work well against more aggressive interfering sources such as IEEE 802.11 system.

To that end, it is one object of some embodiments to enhance IEEE 802.15.4 CSMA/CA mechanism to provide heterogeneous coexistence functions to achieve better coexistence against more aggressive interfering sources.

Accordingly, some embodiments of the invention provide active carrier sense (ACS) based CSMA/CA mechanism for IEEE 802.15.4 standards, wherein active channel sense is performed using consecutive clear channel assessment (CCA) operations when the channel is detected to be busy, wherein the consecutive CCA operations is to perform CCA repeatedly until the channel becomes idle or the maximum number of consecutive CCAs have been performed.

Some embodiments are based on the recognition that energy saving is critical for battery powered devices. However, for the devices such as smart meters connected to powerline, the energy is not constrained. Therefore, the devices connected to powerline can proactively sense channel to increase their channel access opportunities and mitigate the consequence caused by interference from other systems.

Accordingly, it is one object of some embodiments that active carrier sense is to continuously monitor the busy channel Once the channel becomes idle, an IEEE 802.15.4 device that is attempting for transmission may transmit immediately based on an optimal channel access probability, wherein the optimal channel access probability is to avoid the collision among IEEE 802.15.4 transmissions.

Some embodiments are based on the recognition that the maximum number of backoffs (macMaxCSMABackoffs) specified in IEEE 802.15.4 CSMA/CA mechanism is designed for homogeneous IEEE 802.15.4 network and does not consider the interference networks, where the number of backoffs (NB) can quickly reach the predefined threshold macMaxCSMABackoffs due to the transmissions of interference networks. As a result, the IEEE 802.15.4 packet can be discarded.

To that end, the ACS based CSMA/CA (ACS-CSMA/CA) dynamically adapts the value of the threshold macMaxCSMABackoffs to avoid packet discard as the number of backoffs exceeds the macMaxCSMABackoffs when the interference is severe, wherein the macMaxCSMABackoffs adaptation is to dynamically increase the value of macMaxCSMABackoffs based on the severity of the interference from the interfering networks. Once the interference becomes not severe, the value of the macMaxCSMABackoffs is dynamically changed back to the predefined value.

Accordingly, the value of the macMaxCSMABackoffs is multiplied by an interference factor that is determined based on interference metrics such that the interference factor is greater than or equal to one.

According to some embodiments of the present, a computer-executed method is provided for IEEE 802.15.4 based on an active carrier sense based carrier-sense multiple access with collision avoidance (ACS-CSMA/CA) control program and standard CSMA/CA control program for coexistence of an IEEE 802.15.4 network composing of IEEE 802.15.4 devices and IEEE 802.11 network composing of IEEE 802.11 devices sharing frequency spectra between the networks. In this case, the computer-executed method is provided on an IEEE 802.15.4 device. The computer-executed method causes a processor of the IEEE 802.15.4 device to perform steps that comprise estimating a severity of IEEE 802.11 interference based on a severity estimation metric; selecting the ACS-CSMA/CA control program based on the estimated severity, wherein the ACS-CSMA/CA control program is configured to perform dynamically updating a maximum number of backoffs (macMaxCSMABackoffs) based on the estimated severity; determining if a number of backoffs (NB) exceeds the updated macMaxCSMABackoffs; performing consecutive CCA operation to continuously detect channel status, and the processor of the IEEE 802.15.4 device performs transmitting frames when the detected channel status is an idle state or incrementing number of retransmissions (NR) when the detected channel status is a busy state.

Further, some embodiments of the present invention are based on recognition that an IEEE 802.15.4 device can be provided for coexistence of an IEEE 802.15.4 network composing of IEEE 802.15.4 devices and an IEEE 802.11 network composing of IEEE 802.11 devices sharing frequency spectra between the networks. The IEEE 802.15.4 device may include a receiver configured to receive packets of neighbor IEEE 802.15.4 devices; a memory configured to store a computer-executed method including an active carrier sense based carrier-sense multiple access with collision avoidance (ACS-CSMA/CA) control program and standard CSMA/CA control program; a processor configured to execute the computer-executed method. In this case, the computer-executed method causes the processor to perform steps that include estimating a severity of IEEE 802.11 interference based on a severity estimation metric; selecting the ACS-CSMA/CA control program based on the estimated severity, wherein the ACS-CSMA/CA control program is configured to perform dynamically updating a maximum number of backoffs (macMaxCSMABackoffs) based on the estimated severity; determining if a number of backoffs (NB) exceeds the updated macMaxCSMABackoffs; and performing consecutive CCA operation to continuously detect channel status; and a transmitter configured to transmit packets when the detected channel status indicates an idle state.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

IEEE 802.15.4 standard family and IEEE 802.11 standard family are two widely used wireless technologies for local area networks and personal area networks.

IEEE 802.15.4g is a standard in IEEE 802.15.4 standard family designed for wireless smart utility networks (Wi-SUN), and IEEE 802.11ah is a standard in IEEE 802.11 standard family and is named as Wi-Fi HaLow.

However, there is considerable overlap in use cases for these two standard families. For example, both IEEE 802.11ah and IEEE 802.15.4g are developed to operate in the Sub-1 GHz (SIG) frequency bands for outdoor IoT applications such as smart utility and smart city while IEEE 802.15.4g can also operate in the 2.4 GHz frequency band. Therefore, IEEE 802.11 system can be a major interference source to IEEE 802.15.4 system.

Figure 2A:
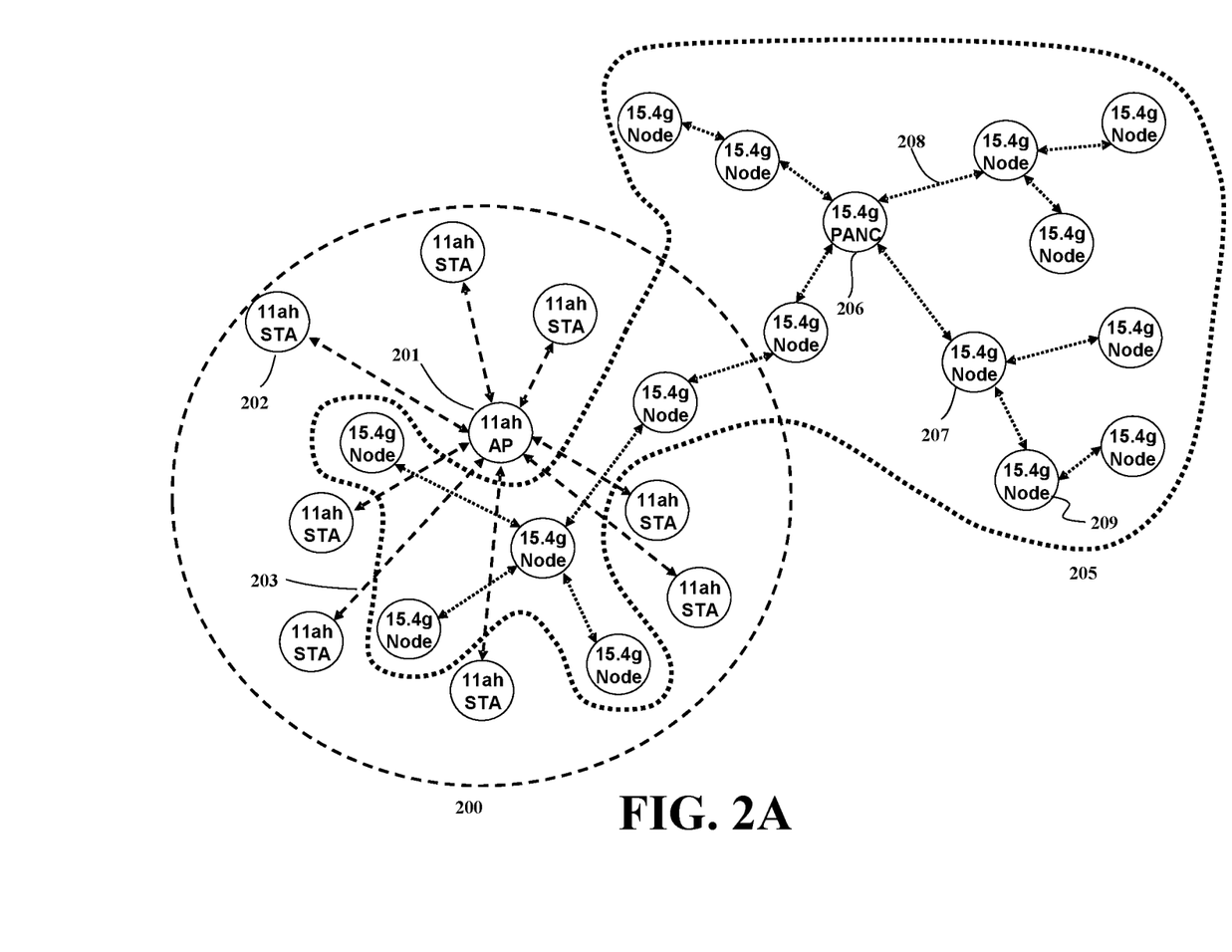
FIG. 2A is a schematic diagram of the heterogeneous system consisting of the co-located IEEE 802.11ah network and IEEE 82.15.4g network, according to some embodiments of the present invention.

FIG. 2A shows a schematic of the heterogeneous system consisting of the coexisting IEEE 802.11ah network 200 and IEEE 802.15.4g network 205. IEEE 802.11ah network 200 contains an Access Point (AP) 201 and the associated stations (STAs) 202, in which AP 201 and STAs 202 communicate via the IEEE 802.11ah wireless link 203. IEEE 802.15.4g network 205 contains a Personal Area Network Coordinator (PANC) 206 and the associated nodes 207. PANC and nodes communicate through the IEEE 802.15.4g wireless link 208. Two networks are co-located close enough so that portion of the IEEE 802.15.4g network 205 is within the communication range of IEEE 802.11ah network 200. Therefore, IEEE 802.11ah network 200 can interfere with IEEE 802.15.4g network 205 when their operating channels share frequency spectrum.

The topology of IEEE 802.11ah network 200 and IEEE 802.15.4g network 200 can be star, mesh or tree, e.g., IEEE 802.11ah network 200 is star topology and IEEE 802.15.4g network 205 is tree topology. In some cases, an IEEE 802.15.4g network 205 can be an IEEE 802.15.4g based smart meter network configured as tree topology. It should be noted that the connections of the tree type configurations can be changed according to the states of communications. In addition, it is not necessary for all nodes to directly connect to the PANC 206. In other words, an IEEE 802.15.4 node can connect to the PANC 206 by a multi-hop manner, e.g. PANC 206802.15.4g Node 207802.15.4g Node 209.

Figure 3:
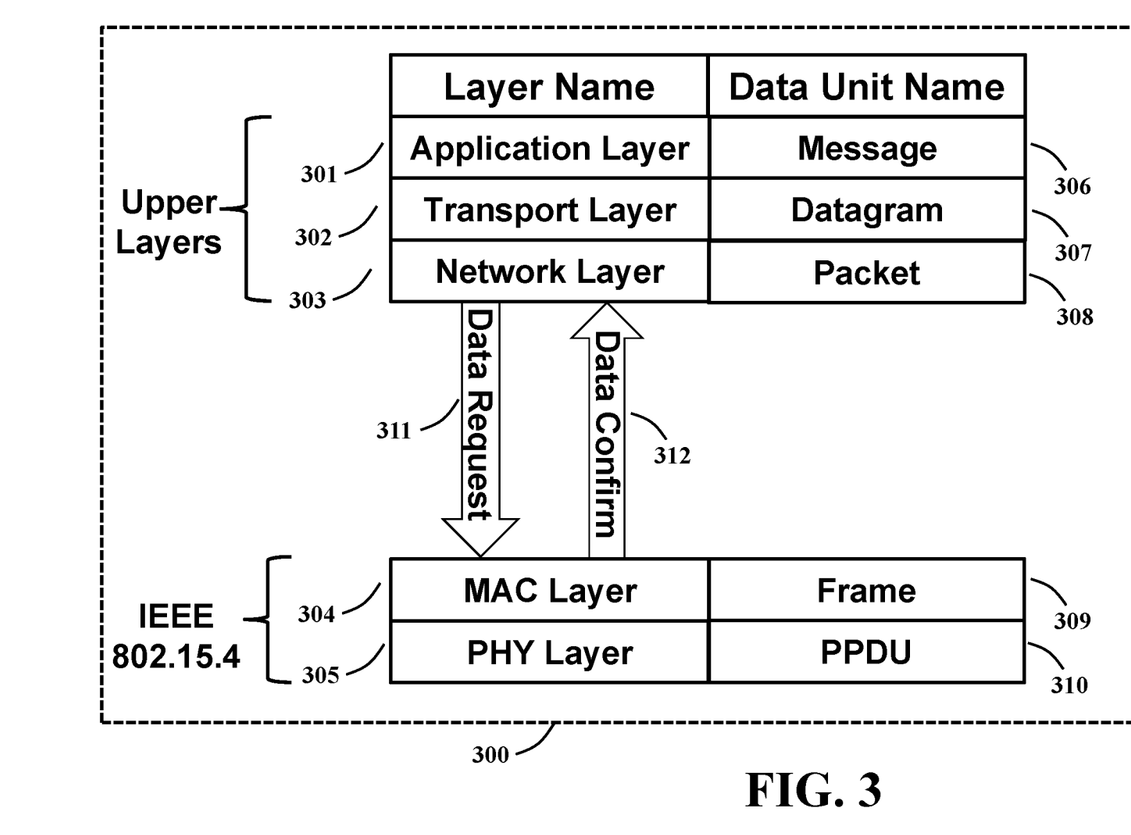
FIG. 3 illustrates network protocol stack for an IEEE 802.15.4 based network and interfaces between upper layers and IEEE 802.15.4 protocol for data transmission request and data transmission status confirm, according to embodiments of the present invention.

For an IEEE 802.15.4 device participating in the IEEE 802.15.4 network, FIG. 3 shows the network protocol stack, where application layer 301, transport layer 302 and network layer 303 are upper layers with respect to IEEE 802.15.4 protocol that consists of MAC layer 304 and PHY layer 305. In this protocol stack, the conventional link layer functions can be incorporated into MAC layer 304. The upper layers request IEEE 802.15.4 protocol for data transmission using Data Request interface 311 and IEEE 802.15.4 protocol responds to the upper layers with respect to data transmission request using Data Confirm interface 312.

Data Request 311 requests the transfer of data to another device. The data in Data Request 311 can be upper layer application data, management data, etc. Besides data, the Data Request 311 also includes other parameters such as destination address, destination network ID, AckTX and data rate to instruct the data transmission. The AckTX is a boolean parameter indicating if the acknowledgement (ACK) is requested or not. If yes, MAC layer 304 sets acknowledgment request (AR) field of the frame to 1. Otherwise, the AR field is set to 0. Upon receiving the frame, the recipient responds to the transmitter with an ACK if AR=1.

The Data Confirm 312 returns a status of either SUCCESS, indicating that the request to transmit was successful, or the appropriate error code such as CHANNEL_ACCESS_FAILURE and NO_ACK.

Figure 2B:
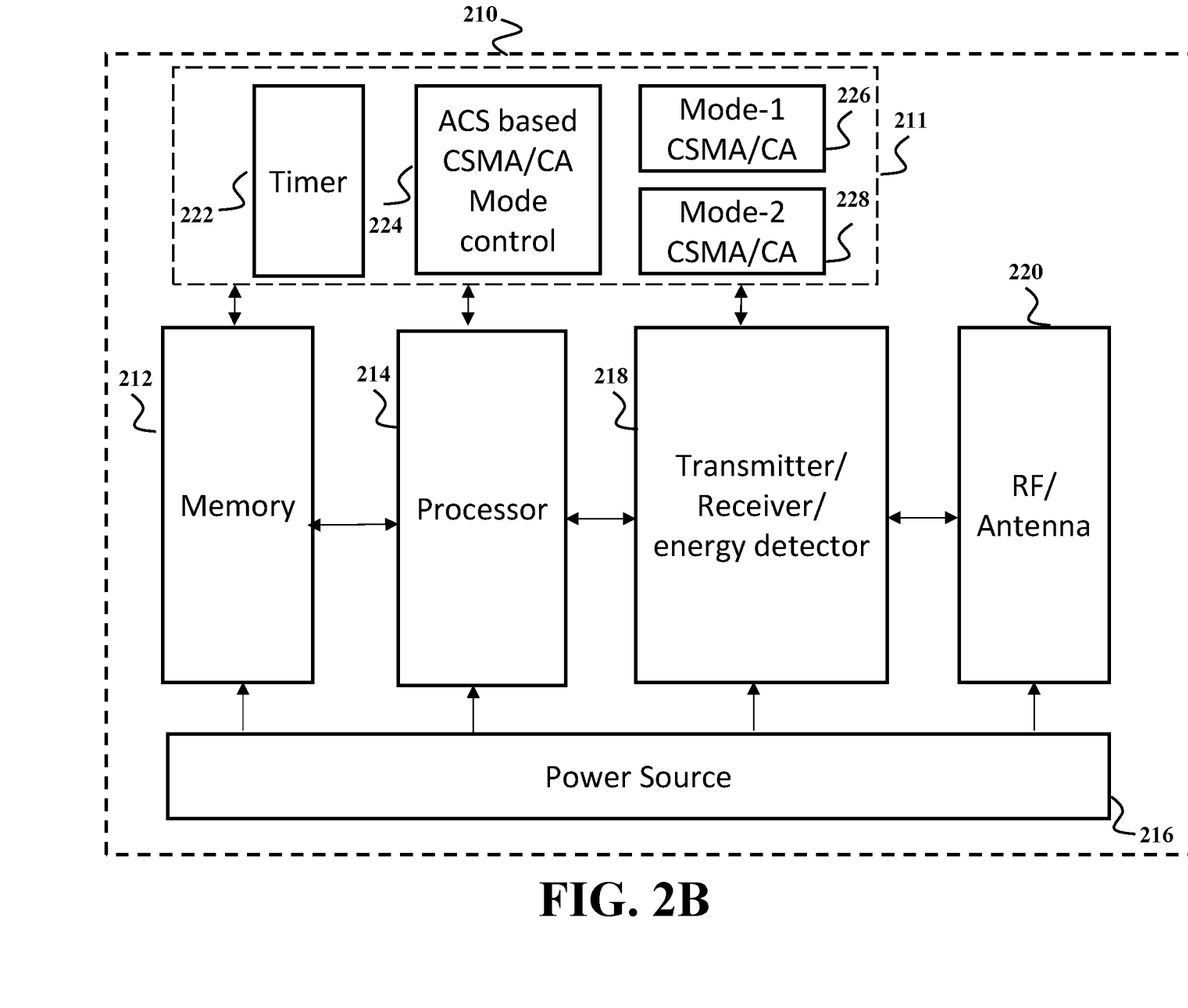
FIG. 2B is a schematic diagram of a structure of an IEEE 802.15.4g device participating in forming the networks of FIG. 2A, according to embodiments of the present invention.

FIG. 2B shows an example of a structure of an IEEE 802.15.4g device participating in forming the networks of FIG. 2A, in which an IEEE 802.15.4g device 210 may include a processor 214, memory 212, a power source 216, a transceiver 218 including transmitter, receiver and energy detector and a RF antenna 220. Further, control programs are included in a storage 211 in connection with the memory 212, the processor 214 and the transceiver 218. The control programs 211 include an ACS-CSMA/CA mode control (program) 224, Mode-1 CSMA/CA program 226 and Mode-2 CSMA/CA program 228, and a timer 222 that is used by the transceiver 218 to perform the CSMA/CA mode control (program) 224. Depending on the severity of IEEE 802.11ah interference, the hybrid CSMA/CA mode control program 224 can either call conventional IEEE 802.15.4 CSMA/CA procedure or immediate channel access enabled CSMA/CA procedure.

FIG. 3 also shows that the data unit name is different at different layer: message 306, datagram 307, packet 308, frame 309 and PHY protocol data unit (PPDU) 310 for application layer 301, transport layer 302, network layer 303, MAC layer 304 and PHY layer 305, respectively.

The upper layer data are forwarded to IEEE 802.15.4 protocol for transmission. Upon receiving a Data Request 311 from upper layers, IEEE 802.15.4 MAC encapsulates the data into a frame and then starts frame transmission attempt. It should be noted that multicast and broadcast frames do not require acknowledgement (ACK) from recipients. Depending on upper layers, some unicast frames may also not require the ACK.

Figure 4:
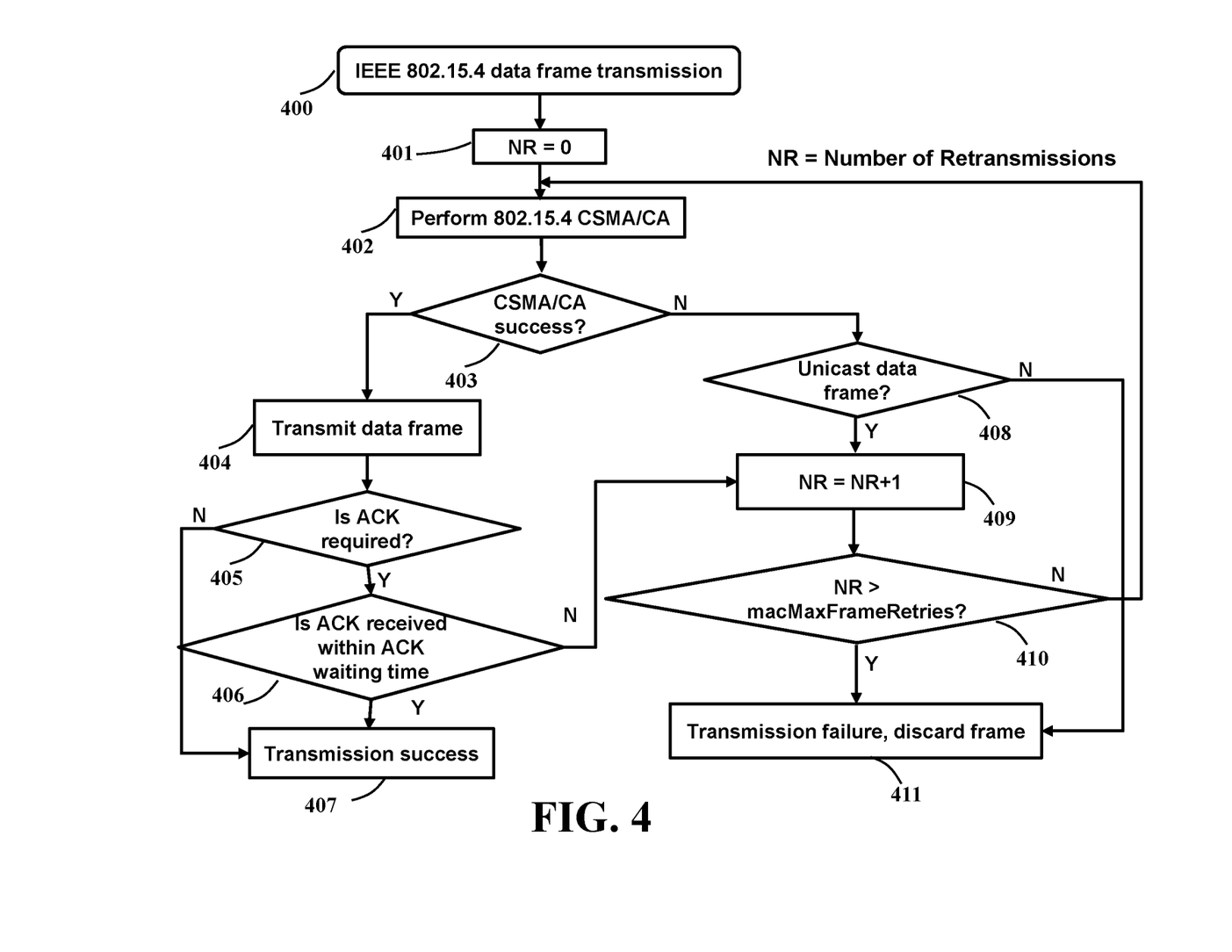
FIG. 4 depicts data transmission flow diagram and transmission status report to the upper layers, according to embodiments of the present invention.

FIG. 4 shows IEEE 802.15.4 data frame transmission procedure 400. IEEE 802.15.4 MAC sets, in step 401, the number of retransmissions (NR) to 0 and then invokes the CSMA/CA algorithm in step 402, where the conventional IEEE 802.15.4 CSMA/CA algorithm is depicted in FIG. 5.

If the CSMA/CA algorithm returns success status 403, the channel is detected to be idle and therefore, the frame transmission starts 404. If the ACK is not required (AckTX=0) for the frame 405, IEEE 802.15.4 MAC concludes transmission success 407 and responds to the upper layers using Data Confirm interface 312 with transmission success status. If the ACK is required (AckTX=1) 405 and the ACK is received within the ACK waiting time period 406, IEEE 802.15.4 also concludes transmission success 407 and responds to upper layers using Data Confirm interface 312 with transmission success status. If the ACK is required and the ACK is not received within the ACK waiting time period 406, IEEE 802.15.4 MAC increments 409 NR by 1 and checks if the NR is greater than the threshold macMaxFrameRetries 410. If yes, IEEE 802.15.4 MAC concludes the frame transmission failure and discards the frame 411. IEEE 802.15.4 MAC then responds to upper layers using Data Confirm interface 312 with NO_ACK status. If the NR is smaller than or equal to the threshold macMaxFrameRetries 410, IEEE 802.15.4 MAC goes for another transmission attempt.

If the CSMA/CA algorithm returns failure status 403, IEEE 802.15.4 MAC checks if the frame is unicast frame 408. If no, IEEE 802.15.4 MAC concludes the transmission failure and discards the frame 411. IEEE 802.15.4 MAC then responds to upper layers using Data Confirm interface 312 with CHANNEK_ACCESS_FAILURE status. If the frame is unicast frame 408, IEEE 802.15.4 MAC increments 409 NR by 1 and checks if the NR is greater than the threshold macMaxFrameRetries 410. If yes, IEEE 802.15.4 MAC concludes the transmission failure and discards the frame 411. IEEE 802.15.4 MAC then responds to upper layers using Data Confirm interface 312 with CHANNEK_ACCESS_FAILURE status. If the NR is smaller than or equal to the threshold macMaxFrameRetries, IEEE 802.15.4 MAC goes for another transmission attempt.

Figure 5:
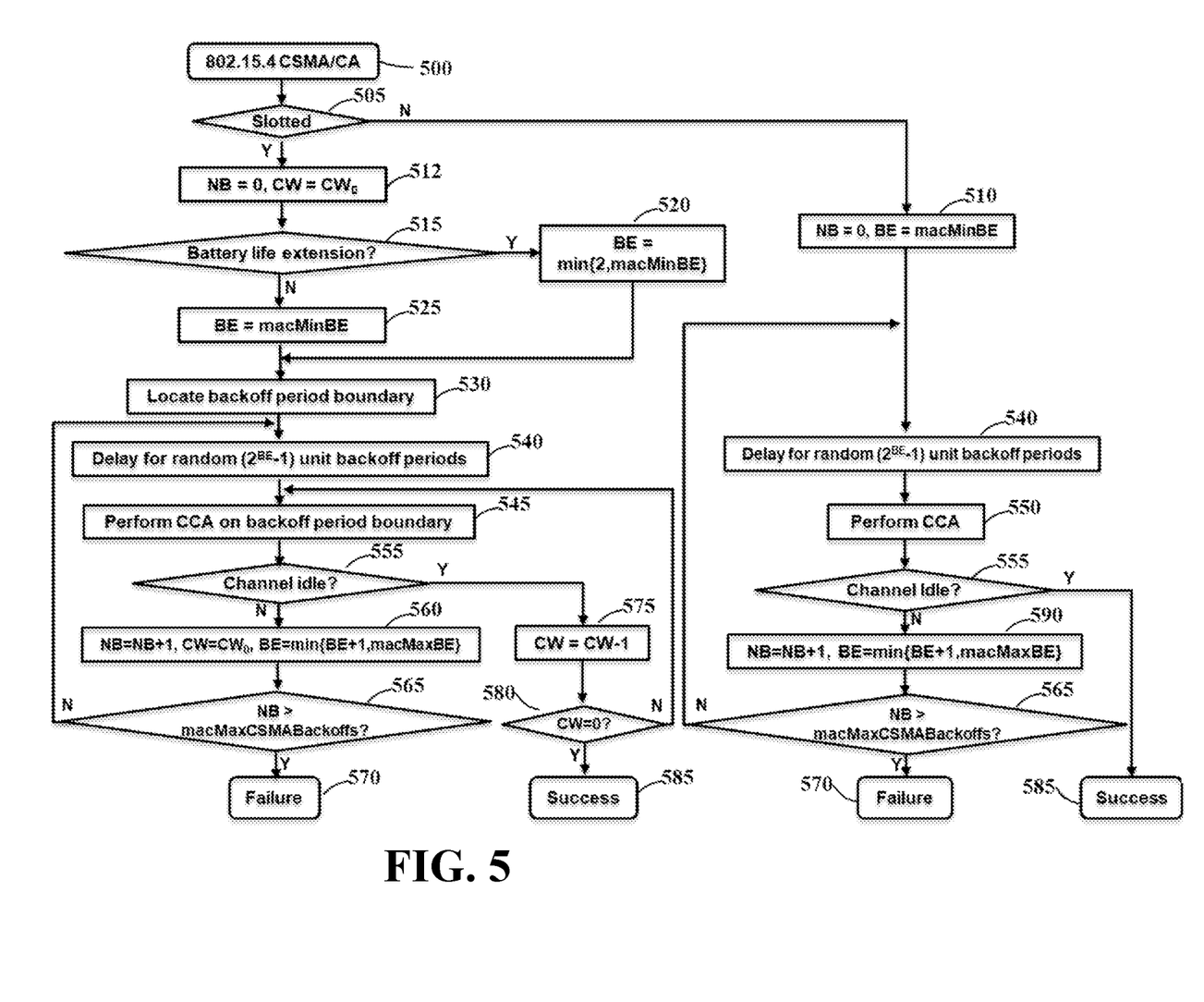
FIG. 5 shows conventional IEEE 802.15.4-2011 carrier sense multiple access with collision avoidance (CSMA/CA) method, according to embodiments of the present invention.

FIG. 5 shows conventional CSMA/CA algorithm 500 in the IEEE 802.15.4-2011. For the non-slotted IEEE 802.15.4 network in step 505, i.e., the beacon unenabled network, the conventional IEEE 802.15.4 CSMA/CA algorithm initials the number of backoff (NB) to 0 and backoff exponent (BE) to the macMinBE in step 510. In step 540, the CSMA/CA algorithm then delays random number of backoff periods with the random number drawn uniformly within interval [0, 2'4], which is called backoff window or delay window, where BE starts with macMinBE and increases until to the macMaxBE. When the random backoff/delay completes, the CSMA/CA algorithm performs CCA operation in step 550. If the channel is detected to be idle in step 555, the CSMA/CA algorithm successes 585 and the frame transmission starts. If the channel is detected to be busy in step 555, the CSMA/CA algorithm updates NB and BE in step 590 as NB =NB+1 and BE=min{BE+1, macMaxBE}. If the NB exceeds the threshold macMaxCSMABackoffs in step 565, the CSMA/CA algorithm terminates with failure status in step 570. Otherwise, CSMA/CA algorithm continues (goes to the random backoff/delay 540).

For the slotted IEEE 802.15.4 network, i.e., the beacon enabled network, the CSMA/CA algorithm initiates 512 NB to 0 and contention window (CW) to $CW_0$, which equals to 1 or 2 depending on country regulation. In this case, the CSMA/CA algorithm initiates BE to the macMinBE in step 525 or min{2, macMinBE} in step 520 depending on if the battery life extension is true or not in step 515. The CSMA/CA algorithm then locates backoff period boundary in step 530 and delays for random number of backoff periods in step 540. When the random delay completes in step 540, the CSMA/CA algorithm performs CCA operation on backoff period boundary in step 545. If the channel is detected to be idle in step 555, the CW is decreased 575 by 1. If the CW equals to 0 in step 580, the CSMA/CA algorithm successes 585 and the frame transmission starts. Otherwise, If the CW is greater than 0 in step 580, another CCA operation is performed on backoff period boundary in step 545. If the channel is detected to be busy in step 555, then CSMA/CA algorithm updates the NB, CW and BE 560 such that NB=NB+1, CW=$CW_0$ and BE=min{BE+1, macMaxBE}. If the NB exceeds the threshold macMaxCSMABackoffs in step 565, the CSMA/CA algorithm terminates with failure status in step 570. Otherwise, if the NB does not exceed the threshold macMaxCSMABackoffs in step 565, the CSMA/CA algorithm continues (goes to step 540 for another random delay).

It can be seen that the larger macMaxCSMABackoffs can reduce the CSMA/CA failure probability. It can also be seen that for both slotted and non-slotted network, the conventional IEEE 802.15.4 CSMA/CA algorithm performs the random delay first no matter how long channel has been idle.

Using this "Backoff+CCA" based CSMA/CA mechanism, IEEE 802.15.4 has disadvantage to compete for channel access with more aggressive IEEE 802.11, which uses "CCA+Backoff" based CSMA/CA mechanism. Performing CCA before Backoff increases the probability to access channel, i.e., transmit, earlier. On the other hand, performing Backoff before CCA decreases channel access probability, especially for the longer backoff such as IEEE 802.15.4 backoff. Therefore, conventional IEEE 802.15.4 CSMA/CA mechanism is not suitable for heterogeneous coexistence, especially for coexistence with more aggressive systems such as IEEE 802.11 system.

In fact, the conventional IEEE 802.11 standards and IEEE 802.15.4 standards are designed for homogeneous network without considering coexistence of heterogeneous networks. Recently, IEEE 802.11ah provides heterogeneous coexistence mechanism such that a Sub-1 GHz (SIG) station (STA) uses energy detection (ED) based clear channel assessment (CCA) with a threshold of −75 dBm per MHz to improve coexistence with other S1G band systems. If a S1G station detects energy above that threshold on its channel, then the mechanisms such as changing operating channel and deferring transmission might be used to mitigate interference.

The question is that if the heterogeneous coexistence mechanism provided in IEEE 802.11ah works well while coexisting with nonaggressive IEEE 802.15.4g network. FIG. 1 shows that data packet delivery rates of the co-located IEEE 802.11ah network and IEEE 802.15.4g network operating in S1G frequency band. Clearly, IEEE 802.15.4g network suffers when network traffic is heavy, but IEEE 802.11ah network always achieves near 100% of packet delivery rate. Therefore, the heterogeneous coexistence method for IEEE 802.15.4 standards must be provided to achieve better performance in the presence of interference from IEEE 802.11 system and other systems such as LoRa, SigFox and RFID.

The CSMA/CA is main channel access mechanism for both IEEE 802.11 standards and IEEE 802.15.4 standards. However, IEEE 802.11 CSMA/CA mechanism is much more aggressive than IEEE 802.15.4 CSMA/CA in channel access contention as explained below.

IEEE 802.11 CSMA/CA and IEEE 802.15.4 CSMA/CA Differences

The CSMA/CA mechanism directly impacts on the coexistence behavior of IEEE 802.11 standards and IEEE 802.15.4 standards. Some embodiments of the present invention use IEEE 802.11ah and IEEE 802.15.4g as examples to explore main CSMA/CA differences that affect coexistence behavior of IEEE 802.11 system and IEEE 802.15.4 system.

1) IEEE 802.11ah ED threshold is higher than IEEE 802.15.4g ED threshold

The IEEE 802.11ah ED threshold is −75 dBm for 1 MHz channel, −72 dBm for 2 MHz channel, −69 dBm for 4 MHz channel and −66 dBm for 8 MHz channel. On the other hand, IEEE 802.15.4g ED threshold is generally lower than IEEE 802.11ah ED threshold. For OFDM PHY, ED threshold is in [−100 dBm, −78 dBm]. For O-QPSK PHY, ED threshold is in [−100 dBm, −80 dBm]. For FSK PHY, ED threshold is in [−100 dBm, −78 dBm] with FEC and in [−94 dBm, −72 dBm] without FEC. IEEE 802.15.4g receiver sensitivity (RS) is 10 dB lower than the corresponding ED threshold.

The higher ED threshold of IEEE 802.11ah can cause interference with IEEE 802.15.4g packet transmission. If the detected energy level of an IEEE 802.15.4g packet transmission is below IEEE 802.15.4g RS or above IEEE 802.11ah ED threshold, IEEE 802.11ah ED-CCA correctly handles the IEEE 802.15.4g packet transmission. However, if the detected energy level of an IEEE 802.15.4g packet transmission is above IEEE 802.15.4g RS and below IEEE 802.11ah ED threshold, the energy level is high enough for IEEE 802.15.4g device to successfully decode the packet. But the packet transmission is disregarded by IEEE 802.11ah devices.

2) IEEE 802.11ah backoff is faster than IEEE 802.15.4g backoff

IEEE 802.11ah backoff is much faster than IEEE 802.15.4g backoff due to the smaller time parameters. An IEEE 802.11ah time slot is 52 μs, CCA time is less than 40 μs and CCA to transmission (TX) turnaround time is less than 5 μs. For IEEE 802.15.4g, the corresponding time parameters depend on symbol rate. With 50 ksymbol/s symbol rate, backoff period is 400 μs, CCA time is 160 μs and CCA to TX turnaround time is 240 μs. These backoff parameters are even larger for smaller symbol rates. Especially for IEEE 802.15.4g PHYs operating in the 920 MHz band and 950 MHz band, backoff period is at least 1000 μs and CCA to TX turnaround time is 1000 μs. The larger time parameters make IEEE 802.15.4g devices operate slowly. The smaller time parameters give IEEE 802.11ah devices advantage in wireless channel access.

As a result, it only takes 104 μs for an IEEE 802.11ah device to backoff two time slots. However, it takes 2000 μs for an IEEE 802.15.4g device operating in the 920 MHz band to backoff two backoff periods. It should be noted that during each backoff time slot/backoff period, transmission process is suspended. This clearly shows the aggressiveness of IEEE 802.11ah over IEEE 802.15.4g.

Other Differences of IEEE 802.11 and IEEE 802.15.4 Affecting Coexistence Behavior There are many differences between IEEE 802.11 standards and IEEE 802.15.4 standards. Followings are two differences that impact coexistence behavior.

1) Suspension of IEEE 802.11 backoff and non-suspension of IEEE 802.15.4 backoff IEEE 802.11 CSMA/CA mechanism performs "CCA+Backoff" operations. In other words, IEEE 802.11 CSMA/CA performs CCA first. If channel is idle for more than DIFS time period, transmission starts immediately. Otherwise, random backoff starts. An IEEE 802.11 packet is discarded when the total number of retransmissions exceeds the Retry-Count threshold. IEEE 802.11 CSMA/CA must perform CCA in each backoff time slot. The backoff procedure can proceed only if the channel is determined to be idle. If the channel is determined to be busy within a time slot, the backoff procedure is suspended and the backoff counter is not decremented.

On the other hand, IEEE 802.15.4 CSMA/CA mechanism performs "Backoff+CCA" operations. In other words, IEEE 802.15.4 CSMA/CA performs backoff first and CCA is performed after backoff completes. However, IEEE 802.15.4 backoff is not interrupted once started.

Therefore, the heterogenous coexistence mechanism for IEEE 802.15.4 should take advantage of the IEEE 802.11 backoff suspension, i.e., actively sensing the channel. Once channel becomes idle, transmission can start.

1) IEEE 802.11 channels are wider than IEEE 802.15.4 channels

IEEE 802.11 channels are wider than IEEE 802.15.4 channels, which causes that IEEE 802.11 network can interfere with multiple IEEE 802.15.4 networks IEEE 802.15.4 CSMA/CA Failure Packet Discard Caused by IEEE 802.11 Traffic In IEEE 802.15.4, data frame transmission failure is incurred by a) CSMA/CA failure or b) transmission failure. The CSMA/CA failure occurs when CSMA/CA algorithm terminates with a failure status because the NB exceeds the threshold macMaxCSMABackoffs as shown in FIG. 5. Transmission failure occurs because of unsuccessful frame transmission or unsuccessful acknowledgement transmission or later acknowledgement receiving. For each CSMA/CA failure or transmission failure, the number of retransmissions (NR) is incremented by 1. An IEEE 802.15.4 frame is discarded with CHANNEL_ACCESS_FAILURE status when the NR exceeds the threshold macMaxFrameRetries due to CSMA/CA failure. An IEEE 802.15.4 packet is discarded with NO_ACK status when the NR exceeds the threshold macMaxFrameRetries due to transmission failure. Because IEEE 802.11 devices are more aggressive than IEEE 802.15.4 devices, IEEE 802.11 transmissions can easily cause CSMA/CA failure packet discard of IEEE 802.15.4 devices as shown in FIGS. 6A and 6B.

Figure 6A:
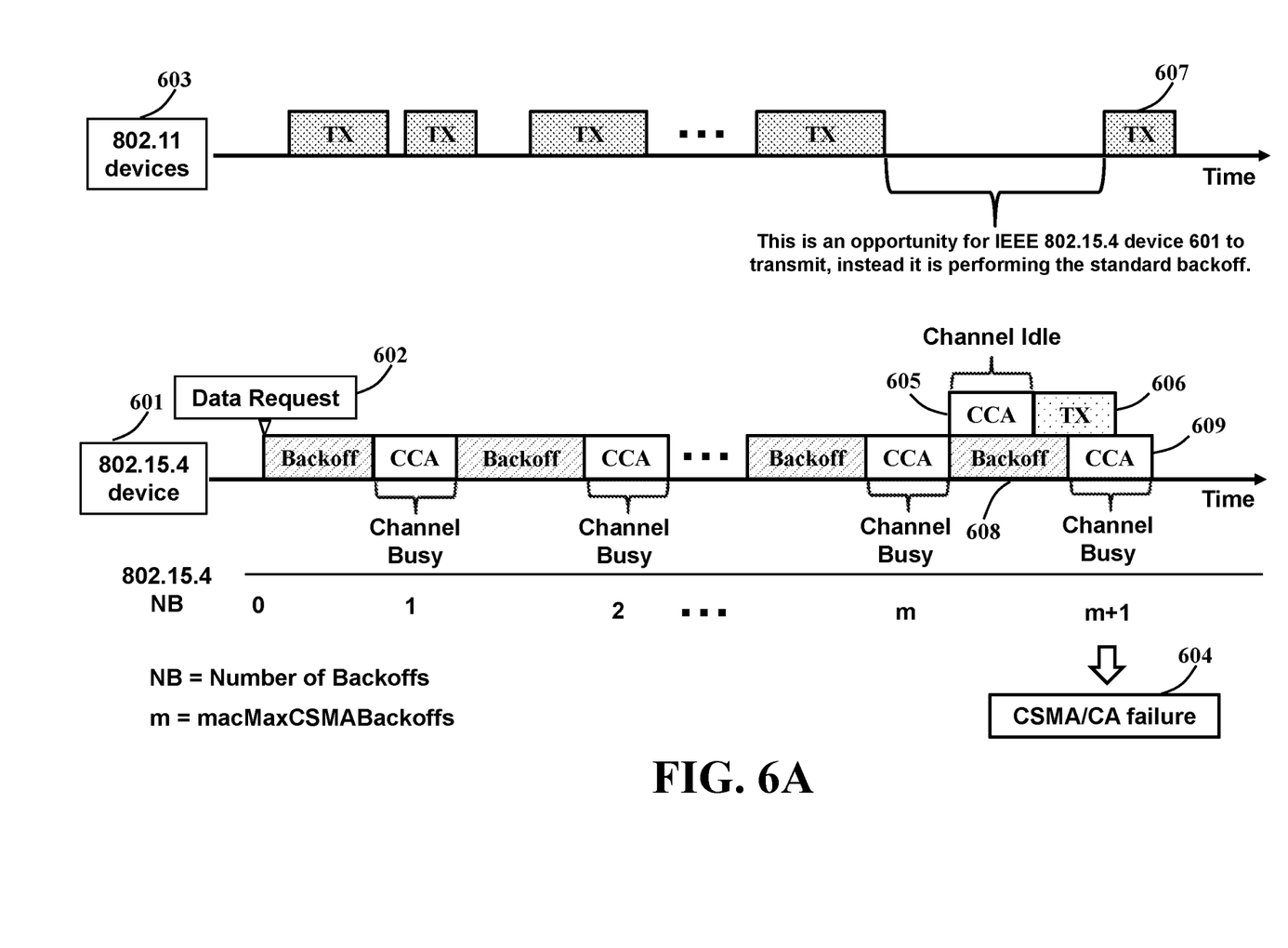
FIG. 6A illustrates the IEEE 802.15.4 CSMA/CA algorithm failure caused by IEEE 802.11 transmissions because IEEE 802.15.4 CSMA/CA algorithm does not actively sense the channel, according to embodiments of the present invention.
Figure 6B:
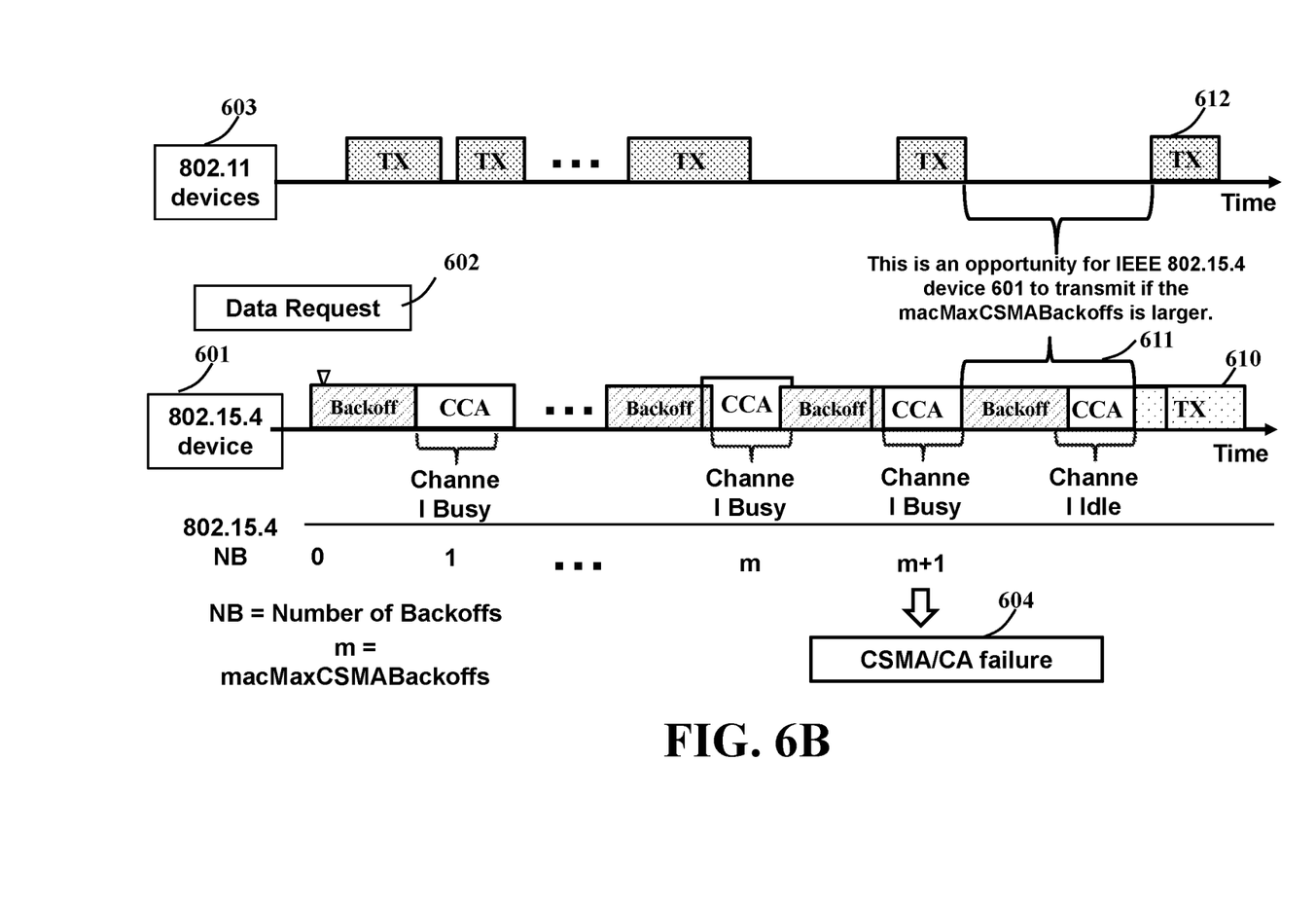
FIG. 6B illustrates the IEEE 802.15.4 CSMA/CA algorithm failure caused by IEEE 802.11 transmissions because IEEE 802.15.4 CSMA/CA algorithm uses the smaller threshold for the number of backoffs allowed, according to embodiments of the present invention.

FIG. 6A shows an example of conventional IEEE 802.15.4 CSMA/CA algorithm failure caused by IEEE 802.11 transmissions. The IEEE 802.15.4 protocol of IEEE 802.15.4 device 601 receives a data transmission request at step 602 from upper layers via Data Request interface. As a result, IEEE 802.15.4 MAC starts frame transmission attempt by invoking the CSMA/CA algorithm, which sets the number of backoffs (NB) to 0 and starts "Backoff+CCA" process. Meanwhile IEEE 802.11 devices 603 transmit packets frequently such that in each IEEE 802.15.4 CCA time period, there is an IEEE 802.11 transmission that overlaps some portion of IEEE 802.15.4 CCA period. Accordingly, each IEEE 802.15.4 CCA operation returns busy channel status. When the NB exceeds the macMaxCSMABackoffs, i.e., reaches 1+macMaxCSMABackoffs, IEEE 802.15.4 CSMA/CA algorithm terminates with failure status 604. For each CSMA/CA algorithm failure, the number of retransmissions (NR) is incremented by 1. When the NR exceeds the predefined threshold macMaxFrameRetries, IEEE 802.15.4 MAC concludes the transmission failure and discards the frame. IEEE 82.15.4 MAC then reports to upper layers via Data Confirm interface 312 with CHANNEL_ACCESS_FAILURE status.

In FIG. 6A, there is an opportunity for IEEE 802.15.4 device 601 to transmit the frame. Had IEEE 802.15.4 device 601 performed consecutive CCA 605, which would return idle channel status, it would start transmission 606. In that case, IEEE 802.11 transmission 607 could be postponed due to IEEE 802.15.4 transmission 606. Instead of using standard CSMA/CA algorithm, IEEE 802.15.4 device 601 is performing the last backoff 608. When the backoff completes in 608, IEEE 802.11 transmission started in 607 already. Therefore, the CCA 609 returns busy channel status. As a result, IEEE 802.15.4 device 601 misses the transmission opportunity 606.

Had the IEEE 802.15.4 device 601 actively sensed the channel, it wouldn't miss the transmission opportunity 606.

FIG. 6B shows another example of transmission opportunity 610 miss by IEEE 802.15.4 device 601, where IEEE 802.15.4 CSMA/CA failure is also caused by IEEE 802.11 transmissions. In this case, IEEE 802.15.4 CSMA/CA algorithm also terminates with failure status 604 when the NB exceeds the macMaxCSMABackoffs. However, there is a transmission opportunity 610 for IEEE 802.15.4 device 601 right after the CSMA/CA algorithm terminates. Had the IEEE 802.15.4 device 601 performed one more "Backoff+

CCA" process 611, it would start transmission 610. In that case, IEEE 802.11 transmission 612 could be postponed due to IEEE 802.15.4 transmission 610. Instead, the standard CSMA/CA algorithm terminates with failure status.

In FIG. 6B, had the macMaxCSMABackoffs been increased by 1, IEEE 802.15.4 device 601 wouldn't miss transmission opportunity 610.

FIGS. 6A and 6B clearly show that the standard IEEE 802.15.4 CSMA/CA mechanism must be enhanced to avoid packet discard when the interference from other systems such as IEEE 802.11 system is severe.

Active Carrier Sense Based CSMA/CA for IEEE 802.15.4

Some embodiments of the invention provide the active carrier sense (ACS) based CSMA/CA (ACS-CSMA/CA) for IEEE 802.15.4 to address CSMA/CA failure packet discard caused by aggressive IEEE 802.11 transmissions.

Figure 7:
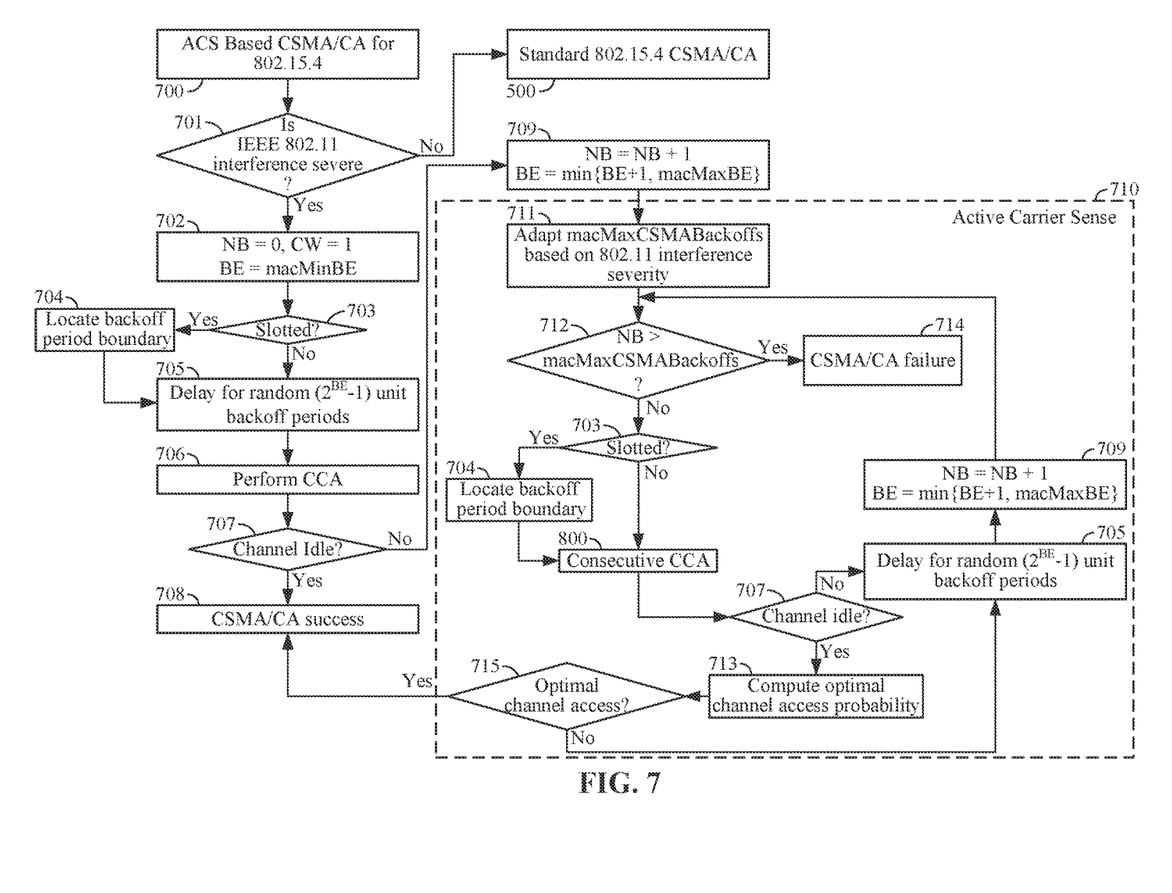
FIG. 7 shows flow chart of the active carrier sense (ACS) based carrier sense multiple access with collision avoidance (CSMA/CA) method for IEEE 802.15.4, according to embodiments of the present invention.

FIG. 7 shows the flow chart of the ACS-CSMA/CA 700 for IEEE 802.15.4 to achieve better coexistence with IEEE 802.11. The ACS-CSMA/CA allows IEEE 802.15.4 devices to avoid channel access failure packet discard when IEEE 802.11 interference or other interference is severe.

The ACS-CSMA/CA includes three key functions: macMaxCSMABackoffs adaptation, consecutive CCA and optimal channel access decision making.

The ACS-CSMA/CA first checks 701 if IEEE 802.11 interference is severe. if no, the standard IEEE 802.15.4 CSMA/CA algorithm 500 is applied. if yes, it initiates 702 NB, CW and BE as NB=0, CW=1 and BE=macMinBE. It then checks if the CSMA/CA is slotted or not 703, i.e., if the IEEE 802.15.4 network is beacon enabled or not. If not, it performs standard backoff 705+CCA 706 operations. If yes, it locates backoff period boundary 704 and then performs standard backoff 705+CCA 706 operations 705. After completion of CCA 706, the ACS-CSMA/CA algorithm checks if the channel is idle 707. If the channel is idle, the CSMA/CA algorithm successes and frame transmission starts 708. If the channel is busy, the ACS-CSMA/CA algorithm updates NB and BE as NB=NB+1 and BE=min{BE+1, macMaxBE} 709 and then goes to the invented ACS routine 710.

In the ACS routine 710, the ACS-CSMA/CA dynamically adapts the macMaxCSMABackoffs based on severity of the IEEE 802.11 interference in step 711. More specifically, it increases the macMaxCSMABackoffs to $$\text{macMaxCSMABackoffs} = \text{InterferenceFactor}_{11} * \text{macMaxCSMABackoffs}, \quad (1)$$

where IEEE 802.11 interference factor InterferenceFactor$_{11}$≥1 can be computed based on the specific IEEE 802.11 interference severity metric. Take channel occupancy time ratio for example, let CHOR$_{11}$ be the channel occupancy time ratio of IEEE 802.11 system measured by an IEEE 802.15.4 device, the InterferenceFactor$_{11}$ can be defined as $$\text{Interference Factor}_{11} = \left[\frac{1}{1 - CHOR_{11}}\right] \quad (2)$$

It is noted that the larger macMaxCSMABackoffs can avoid packet discard probability due to the CSMA/CA failure as illustrated in FIG. 6B.

Figure 8:
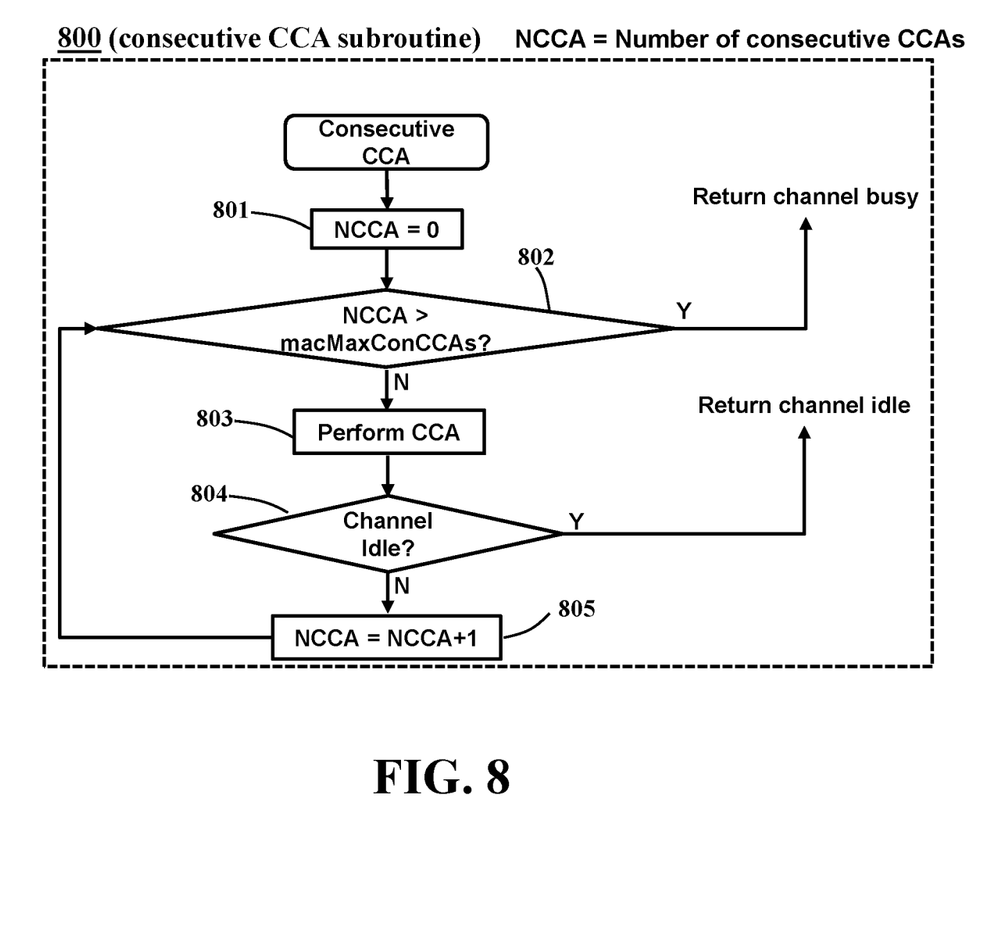
FIG. 8 shows functional block diagram of consecutive CCA procedure in ACS based CSMA/CA method, according to embodiments of the present invention.

The ACS routine then checks if the NB exceeds the updated macMaxCSMABackoffs 712. If yes, the ACS-CSMA/CA algorithm terminates with failure status 714. If no, the ACS routine checks if the CSMA/CA is slotted or not 703, i.e., if the IEEE 802.15.4 network is beacon enabled or not. If not, it invokes consecutive CCA subroutine 800 as shown in FIG. 8. If yes, it locates backoff period boundary 704 and then invokes consecutive CCA subroutine 800 as shown in FIG. 8. If the consecutive CCA subroutine 800 returns idle channel status 707, the ACS routine computes 713 an optimal channel access probability to decide to transmit or go for another round of consecutive CCA operation because it is possible that multiple neighboring IEEE 802.1.5.4 devices perform active carrier sense. When channel becomes idle, if multiple neighboring IEEE 802.15.4 devices start transmission, these transmissions can collide.

To compute the optimal channel access probability, an IEEE 802.15.4 device determines the number of IEEE 802.15.4 neighbors by 1) using neighbor solicitation message or 2) monitoring neighbor's packet transmission. Assume there are $N_4$ IEEE 802.15.4 devices in a neighborhood and each device $D_i^A$ (i=1, 2, . . . , $N_4$) has probability p to access channel immediately and probability 1−p not to access channel immediately. Let $X=\Sigma_{i=1}^{N_4} X_i$ denote binomial random variable $B(N_4, p)$, where $X_i$ is random variable representing decision of device $D_i^A$. Then $P(X=k)=C_k^{N_g} p^k (1-p)^{N_g-k}$ and $E[X]=N_4 * p$. To avoid internal collision among/between IEEE 802.15.4 transmissions due to the immediate channel access when the channel becomes idle, the optimal strategy is that only one IEEE 802.15.4 device transmits immediately and rest of IEEE 802.15.4 devices do not transmit immediately, i.e., $E[X]=1$, which gives optimal probability $p_o=1/N_4$.

Using optimal probability $P_o$, the ACS routine makes 715 decision on whether transmission starts immediately or not. The ACS routine draws a random value uniformly from interval [0, 1]. If the random value drawn ≤$P_o$, the CSMA/CA algorithm successes 708 and the frame transmission starts immediately. Otherwise, the ACS routine delays for random $(2^{BE}-1)$ unit backoff periods 705, updates NB and BE as NB=NB+1 and BE=min{BE+1, macMaxBE} and then goes for another round of consecutive CCA operation.

For the immediate transmission, the optimal channel access probability $p_o$ is to avoid collision among transmissions by multiple IEEE 802.15.4g devices. Even the optimal channel access probability $p_o$ is $1/N_4$, in some cases, the probability $p_o$ may be changed based on a degree of communication congestion measured by individual IEEE 802.15.4 node or PANC.

FIG. 8 depicts the consecutive CCA subroutine 800, where the macMaxConCCAs ≥1 is defined as the maximum number of consecutive CCAs and the NCCA denotes the number of consecutive CCAs performed for current ACS routine. A CCA operation is performed within a standard defined phyCCADuration/aCCATime period. In the consecutive CCA subroutine 800, the CCA operation is repeatedly performed until the channel becomes idle or the macMaxConCCAs CCAs have been performed. After the macMaxConCCAs CCAs have been performed, if the channel is still busy, the consecutive CCA subroutine returns busy channel status. Otherwise, the consecutive CCA subroutine returns idle channel status. As a result, consecutive CCA subroutine returns either idle channel or busy channel.

To that end, consecutive CCA subroutine 800 initiates 801 NCCA=0 and then checks 802 if NCCA exceeds the threshold macMaxConCCAs. If yes, it returns busy channel status. If no, it performs 802 a CCA operation. If the channel is detected to be idle 804, it returns idle channel status. If the channel is detected to be busy, the consecutive CCA subroutine updates NCCA as NCCA=NCCA+1 and then attempts for another round of CCA operation by going to step 802.

It can be seen that the ACS based CSMA/CA (ACS-CSMA/CA) mechanism can avoid missing the transmission opportunity as illustrated in FIG. 6A because consecutive CCA subroutine continuously monitors the channel and therefore, will not miss any idle channel condition.

It can also be seen that the ACS based CSMA/CA mechanism can avoid missing the transmission opportunity as illustrated in FIG. 6B because the larger macMaxCSMABackoffs can reduce the CSMA/CA failure probability and therefore, can increase the transmission opportunity.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A computer-executed method for IEEE 802.15.4 devices based on an active carrier sense based carrier-sense multiple access with collision avoidance (ACS-CSMA/CA) control program and standard CSMA/CA control program for coexistence of an IEEE 802.15.4 network composing of IEEE 802.15.4 devices and IEEE 802.11 network composing of IEEE 802.11 devices sharing frequency spectra between the networks, wherein the computer-executed method is provided on an IEEE 802.15.4 device, the computer-executed method causes a processor of the IEEE 802.15.4 device to perform steps that comprise: estimating a severity of IEEE 802.11 interference based on a severity estimation metric; selecting the ACS-CSMA/CA control program based on the estimated severity, wherein the ACS-CSMA/CA control program is configured to perform: dynamically updating a maximum number of backoffs (macMaxCSMABackoffs) based on the estimated severity; determining if a number of backoffs (NB) exceeds the updated macMaxCSMABackoffs; and performing consecutive CCA operation to continuously detect channel status; and transmitting frames when the detected channel status is an idle state or 21 incrementing number of retransmissions (NR) when the detected channel status is a 22 busy state.

2. The method of claim 1, wherein the IEEE 802.11 network is an IEEE 802.11ah based Wi-Fi HaLow network and the IEEE 802.15.4 network is an IEEE 802.15.4g based Wi-SUN network, wherein the coexistence frequency bands is Sub-1 GHz frequency band or 2.4 GHz frequency band.

3. The method of claim 1, wherein an IEEE 802.15.4 device applies the standard CSMA/CA channel access mechanism if IEEE 802.11 interference is not severe, wherein an IEEE 802.15.4 device applies the invented active carrier sense based CSMA/CA (ACS-CSMA/CA) channel access mechanism if IEEE 802.11 interference is severe.

4. The method of claim 3, wherein the ACS-CSMA/CA channel access mechanism performs the macMaxCSMABackoffs adaptation and consecutive (repetitive) CCA operations to reduce frame discard caused by IEEE 802.11 interference.

5. The method of claim 4, wherein the macMaxCSMABackoffs adaptation is performed when an IEEE 802.15.4 device applies ACS-CSMA and channel is busy, wherein the macMaxCSMABackoffs is updated using an interference factor (InterferenceFactor.sub.11) with respect to the IEEE 802.11 interference such that the macMaxCSMABackoffs is increased as the severity of IEEE 802.11 interference increases and the macMaxCSMABackoffs is decreased as the severity of IEEE 802.11 interference decreases.

6. The method of claim 5, wherein the macMaxCSMABackoffs is updated according to macMaxCSMABackoffs=InterferenceFactor$_{11}$*macMaxCSMABackoffs.

7. The method of claim 6, wherein the IEEE 802.11 interference factor InterferenceFactor$_{11}$ is computed based on channel occupancy time ratio as $$\text{Interference Factor}_{11} = \left\lceil \frac{1}{1 - CHOR_{11}} \right\rceil,$$

where CHOR$_{11}$ is the channel occupancy time ratio of IEEE 802.11 network measured by an IEEE 802.15.4 device.

8. The method of claim 4, wherein the consecutive CCA is performed when an IEEE 802.15.4 device applies ACS-CSMA and number of backoffs (NB) does not exceed the updated threshold macMaxCSMABackoffs, wherein an IEEE 802.15.4 device continuously senses channel until channel becomes idle or a maximum numbers of consecutive CCAs (macMaxConCCAs) have been performed with channel still being busy.

9. The method of claim 8, wherein the CCA operation is performed within a standard defined phyCCADuration/aCCATime period.

10. The method of claim 1, wherein the ACS-CSMA/CA control program determines whether transmission starts immediately or not based on an optimal channel access probability computed by an IEEE 802.15.4 device.

11. The method of claim 1, wherein the ACS-CSMA/CA mechanism is applied by an IEEE 802.15.4 device to coexist with any interference device, wherein an IEEE 802.15.4 device simultaneously coexist with multiple interfering devices including IEEE 802.11 devices, LoRa devices and SigFox devices.

12. An IEEE 802.15.4 device for coexistence of an IEEE 802.15.4 network composing of IEEE 802.15.4 devices and an IEEE 802.11 network composing of IEEE 802.11 devices sharing frequency spectra between the networks, comprising: a receiver configured to receive packets of neighbor IEEE 802.11 devices; a memory configured to store a computer-executed method including an active carrier sense based carrier-sense multiple access with collision avoidance (ACS-CSMA/CA) control program and standard CSMA/CA control program; a processor configured to execute the computer-executed method, wherein the computer-executed method causes the processor to perform steps that comprise: estimating a severity of IEEE 802.11 interference based on a severity estimation metric; selecting the ACS-CSMA/CA control program based on the estimated severity, wherein the ACS-CSMA/CA control program is configured to perform: dynamically updating a maximum number of backoffs (macMaxCSMABackoffs) based on the estimated severity; determining if a number of backoffs (NB) exceeds the updated macMaxCSMABackoffs; and performing consecutive CCA operation to continuously detect channel status; and a transmitter configured to transmit packets when the detected channel status indicates an idle state.

13. The IEEE 802.15.4 device of claim 12, wherein the IEEE 802.11 network is an IEEE 802.11ah based Wi-Fi HaLow network and the IEEE 802.15.4 network is an IEEE 802.15.4g based Wi-SUN network, wherein the coexistence frequency bands is Sub-1 GHz frequency band or 2.4 GHz frequency band.

14. The IEEE 802.15.4 device of claim 12, wherein the IEEE 802.15.4 device applies the standard CSM A/CA channel access mechanism if IEEE 802.11 interference is not severe, wherein an IEEE 802.15.4 device applies the invented active carrier sense based CSMA/CA (ACS-CSMA/CA) channel access mechanism if IEEE 802.11 interference is severe.

15. The IEEE 802.15.4 device of claim 14, wherein the ACS-CSMA/CA channel access mechanism performs the macMaxCSMABackoffs adaptation and consecutive (repetitive) CCA operations to reduce frame discard caused by IEEE 802.11 interference.

16. The IEEE 802.15.4 device of claim 15, wherein the macMaxCSMABackoffs adaptation is performed when the IEEE 802.15.4 device applies ACS-CSMA and channel is busy, wherein the macMaxCSMABackoffs is updated using an interference factor (InterferenceFactorsub.ii) with respect to the IEEE 802.11 interference such that the macMaxCSMABackoffs is increased as the severity of IEEE 802.11 interference increases and the macMaxCSMABackoffs is decreased as the severity of IEEE 802.11 interference decreases.

17. The IEEE 802.15.4 device of claim 16, wherein the macMaxCSMABackoffs is updated according to $$\text{macMaxCSMABackoffs} = \text{Interference Factor}_{11} * \text{macMaxCSMABackoffs}.$$

18. The IEEE 802.15.4 device of claim 17, wherein the IEEE 802.11 interference factor InterferenceFactoril is computed based on channel occupancy time ratio as $$\text{Interference Factor}_{11} = \left\lceil \frac{1}{1 - CHOR_{11}} \right\rceil,$$

where $CHOR_{11}$ is the channel occupancy time ratio of IEEE 802.11 network measured by an IEEE 802.15.4 device.

19. The IEEE 802.15.4 device of claim 15, wherein the consecutive CCA is performed when the IEEE 802.15.4 device applies ACS-CSMA and number of backoffs (NB) does not exceed the updated threshold macMaxCSMABackoffs, wherein the IEEE 802.15.4 device continuously senses channel until channel becomes idle or a maximum numbers of consecutive CCAs (macMaxConCCAs) have been performed with channel still being busy.

20. The IEEE 802.15.4 device of claim 19, wherein the CCA operation is performed within a standard defined phyCCADuration/aCCATime period.

21. The IEEE 802.15.4 device of claim 12, wherein the ACS-CSMA/CA control program determines whether transmission starts immediately or not based on an optimal channel access probability computed by the IEEE 802.15.4 device.

22. The IEEE 802.15.4 device of claim 12, wherein the ACS-CSMA/CA mechanism is applied to coexist with any interference device, wherein the IEEE 802.15.4 device simultaneously coexist with multiple interfering devices including IEEE 802.11 devices, LoRa devices and SigFox devices.

* * * * *